(12) United States Patent
Armand et al.

(10) Patent No.: US 12,294,647 B2
(45) Date of Patent: May 6, 2025

(54) METHOD AND DEVICE FOR MANAGING A PAIRING REQUEST OF A FIRST DEVICE WITH A SECOND DEVICE

(71) Applicant: Orange, Issy-les-Moulineaux (FR)

(72) Inventors: David Armand, Chatillon (FR); Fabrice Fontaine, Chatillon (FR)

(73) Assignee: Orange, Issy-les-Moulineaux (FR)

( * ) Notice: Subject to any disclaimer, the term of this patent is extended or adjusted under 35 U.S.C. 154(b) by 161 days.

(21) Appl. No.: 18/002,352

(22) PCT Filed: Jun. 7, 2021

(86) PCT No.: PCT/FR2021/051022
§ 371 (c)(1),
(2) Date: Dec. 19, 2022

(87) PCT Pub. No.: WO2021/255363
PCT Pub. Date: Dec. 23, 2021

(65) Prior Publication Data
US 2023/0239145 A1 Jul. 27, 2023

(30) Foreign Application Priority Data
Jun. 19, 2020 (FR) ...................................... 2006407

(51) Int. Cl.
*H04L 9/08* (2006.01)

(52) U.S. Cl.
CPC .................................... *H04L 9/088* (2013.01)

(58) Field of Classification Search
CPC ..... H04L 9/088; H04L 9/3226; H04L 9/0819; H04L 9/3263; H04L 9/3271; H04L 2209/80; G09C 1/00
See application file for complete search history.

(56) References Cited

U.S. PATENT DOCUMENTS

| 8,464,054 B2* | 6/2013 | Prestidge ............ H04W 12/069 713/168 |
| 10,122,756 B1* | 11/2018 | Kelly ...................... H04L 63/18 |

(Continued)

FOREIGN PATENT DOCUMENTS

EP 2018934 A1 1/2009

OTHER PUBLICATIONS

English translation of the Written Opinion of the International Searching Authority dated Sep. 22, 2021 for corresponding International Application No. PCT/FR2021/051022, filed Jun. 7, 2021.

(Continued)

*Primary Examiner* — Han Yang
(74) *Attorney, Agent, or Firm* — David D. Brush; Westman, Champlin & Koehler, P.A.

(57) ABSTRACT

A method for managing a request to pair a first item of equipment with a second item of equipment is implemented by a device for managing a pairing request. The managing device is configured to communicate with the first item of equipment via an optical communication channel. The managing method includes: reception, via the optical communication channel, of a pairing request including data representative of the identity of the first item of equipment; and if the pairing request is authorized, transmission, via the optical communication channel, of a security key to the first item of equipment to be used during communications between the first item of equipment and the second item of equipment once the items of equipment have been paired.

13 Claims, 3 Drawing Sheets

(56) References Cited

U.S. PATENT DOCUMENTS

2015/0222517 A1* 8/2015 Mclaughlin ............. H04W 4/70
                                                    713/171
2023/0156474 A1* 5/2023 Bouvet ................ H04W 12/50
                                                    726/6

OTHER PUBLICATIONS

International Search Report dated Sep. 22, 2021 for corresponding International Application No. PCT/FR2021/051022, filed Dec. 16, 2022.
Written Opinion of the International Searching Authority dated Sep. 22, 2021 for corresponding International Application No. PCT/FR2021/051022, filed Dec. 16, 2022.

* cited by examiner

METHOD AND DEVICE FOR MANAGING A PAIRING REQUEST OF A FIRST DEVICE WITH A SECOND DEVICE

CROSS-REFERENCE TO RELATED APPLICATIONS

This Application is a Section 371 National Stage Application of International Application No. PCT/FR2021/051022, filed Jun. 7, 2021, which is incorporated by reference in its entirety and published as WO 2021/255363 A1 on Dec. 23, 2021, not in English.

FIELD OF THE DISCLOSURE

The present invention relates to a method for managing a request to pair a first item of equipment with a second item of equipment.

It further relates to a device for managing a pairing request implementing the aforementioned method.

The invention is in particular applicable to items of equipment communicating by means of radio waves, in a professional context, for example in meeting rooms or offices, but also in a domestic context.

BACKGROUND OF THE DISCLOSURE

In order to secure communications between two items of equipment communicating using wireless technology, it is necessary to implement a pairing phase during which data are exchanged between the items of equipment in order to determine a security key. This security key will be used during communications between the items of equipment.

The pairing phase between two items of equipment may be initiated in various ways. For example, the pairing phase may be started by a user action such as pressing a button, switching on the item of equipment, or entering a PIN code.

During this pairing phase, the items of equipment are vulnerable to attacks that may compromise the security of subsequent exchanges between the items of equipment. For example, a third party may observe the exchanges between the two items of equipment and generate the security key that will be used in subsequent exchanges between the items of equipment. In another example, a third-party item of equipment operated by a malicious user may pair with an access point, without a legitimate item of equipment noticing. Thus, an item of equipment seeking to pair with its access point may connect to a malicious access point without the user of the item of equipment being informed.

The present invention proposes to improve this situation by securing pairing requests between items of equipment.

SUMMARY

To this end, the invention relates, according to a first aspect, to a method for managing a request to pair a first item of equipment with a second item of equipment implemented by a device for managing a pairing request, said managing device being configured to communicate with the first item of equipment via an optical communication channel. The managing method comprises:
  reception, via the optical communication channel, of a pairing request comprising data representative of the identity of the first item of equipment, and—if the pairing request is authorized, transmission, via the optical communication channel, to the first item of equipment, of a security key to be used during communications between the first item of equipment and the second item of equipment once the items of equipment have been paired.

As the first item of equipment and the managing device establish an optical communication channel, the messages exchanged between them are difficult for a third party to intercept.

Specifically, an optical communication channel is created when a photoreceiver receives a signal from a light source. For the optical communication channel to be created, the photoreceiver must be located within the region illuminated by the light source. There must be no obstacle, such as a wall, between the light source and the photoreceiver. If an obstacle is present between the light source and the photoreceiver, the optical communication channel cannot be established.

Thus, for the two-way optical communication channel to be established between the first item of equipment and the managing device, a photoreceiver integrated into the device for managing a pairing request must be in the region of a light source integrated into the first item of equipment and a photoreceiver integrated into the first item of equipment must be in the region illuminated by a light source integrated into the managing device.

Consequently, the exchanges between the device for managing a pairing request and the first item of equipment are difficult for a third party to observe. Furthermore, pairings resulting from malicious acts are limited. In other words, there is a low chance of a malicious third party intercepting messages exchanged between the first item of equipment and the managing device, and hence of successfully pairing with the second item of equipment or of masquerading as the first item of equipment.

Consequently, communication between the device for managing a pairing request and the first item of equipment is secure, especially with respect to communications carried out via radio waves, this type of wave being omnidirectional.

If the pairing request is refused, pairing is not implemented.

If the pairing request is authorized, pairing is implemented. During pairing, the managing device sends the first item of equipment security keys associated with the second item of equipment. These security keys will be used during communications between the first item of equipment and the second item of equipment once the items of equipment have been paired. Specifically, the security key is used to encrypt and authenticate subsequent communications between the first item of equipment and the second item of equipment.

In one embodiment, the managing device has a list, which is for example stored in memory, containing the security keys of the items of equipment to which it is connected, and in particular of the second item of equipment.

In another embodiment, the first item of equipment and the second item of equipment exchange security keys via said managing device. In other words, the managing device receives, from the second item of equipment, the security key to be transmitted to the first item of equipment.

In one embodiment, the managing device is configured to communicate with the second item of equipment via a wired communication channel.

Thus, the exchanges between the managing device and the second item of equipment are secure. Furthermore, unlike the communications via the optical communication channel, the relative position of the managing device and of the second item of equipment is not subject to constraints, and they may be installed as desired. For example, the managing device and the second item of equipment may be placed in different rooms. Furthermore, the managing device and the second item of equipment may be located remotely. Therefore, the first item of equipment and the second item of equipment may be located remotely and paired in a secure manner via the managing device.

In another embodiment, the managing device is configured to communicate with the second item of equipment via an optical communication channel.

This embodiment has the advantage of avoiding the need to install wires while guaranteeing secure communications between the managing device and the second item of equipment.

It will be noted that the security key is transmitted via the optical communication channel established between the managing device and the first item of equipment and that the items of equipment then communicate via a radio communication channel, or via the managing device, using the security key. Specifically, once they have been paired, the items of equipment communicate using the security key received by the first item of equipment via the optical communication channel.

According to one feature, the data representative of the identity of the first item of equipment comprise a certificate associated with the first item of equipment.

Thus, the pairing request comprises the certificate associated with the first item of equipment.

According to another feature, the data representative of the identity of the first item of equipment further comprise a sequence of data representative of a fingerprint uniquely identifying said first item of equipment.

Thus, the pairing request comprises a fingerprint uniquely identifying the first item of equipment, in addition to the certificate.

In other embodiments, the pairing request comprises either the certificate, or the fingerprint identifying the first item of equipment.

According to one feature, the managing method comprises storing the received certificate in association with the received fingerprint.

For example, the certificate and the fingerprint are stored in a database. This database may be in the managing device or connected to the managing device.

According to one feature, the sequence of data representative of the fingerprint is generated by the first item of equipment, prior to the transmission of the pairing request to the managing device.

The fingerprint (and the sequence of data representative of the fingerprint) may be generated each time a pairing request is sent to the managing device. The same fingerprint, which is an identifier unique to the first item of equipment, is generated each time and said fingerprint remains the same over time.

For example, the fingerprint generated is an optical fingerprint, generation of the fingerprint comprising illuminating a transparent area located in the first item of equipment, the fingerprint corresponding to a single image generated by illuminating said area.

According to one feature, said at least one verification of the data identifying the first item of equipment comprises verifying the possession of a private key associated with the certificate, by the first item of equipment.

The pairing request is authorized if the first item of equipment possesses said private key. Thus, the request to pair the first item of equipment is authorized, if the first item of equipment has proof of possession of the private key associated with said certificate.

According to one feature, the verification of the possession of the private key comprises:
transmitting, to the first item of equipment, a first datum that is randomly generated on receipt of the pairing request,
receiving, from the first item of equipment, a second datum corresponding to the first datum encrypted,
decrypting the second datum with a public key contained in the received certificate, and
if the second datum decrypted corresponds to the generated first datum, determining that the first item of equipment has the private key in its possession.

According to one feature, said at least one verification of the data identifying the first item of equipment comprises verifying whether the received certificate was issued by a predetermined certification authority.

The pairing request is authorized if the verification result is positive.

For example, the predetermined certification authority belongs to a list of trusted certification authorities stored in the managing device.

According to one feature, said at least one verification of the data identifying the first item of equipment comprises verifying whether the first item of equipment associated with the received certificate is authorized to pair.

In practice, the verification comprises consulting, in a database, data associated with the certificate, and determining, depending on the data associated with the certificate, whether the first item of equipment associated with the certificate is authorized to pair via the managing device.

According to one feature, said at least one verification comprises verifying whether the fingerprint has been previously received in association with a certificate different from said certificate received in the pairing request.

Depending on the result of the aforementioned verifications, the managing device determines whether the pairing request may be authorized or must be refused. According to embodiments, one or more of the verifications described above are implemented.

For example, the pairing request is refused if the first item of equipment does not possess the private key associated with the certificate (for example if the managing device sends a random datum to the first item of equipment for it to encrypt with the private key associated with the certificate, then decryption of the encrypted datum sent in return fails when the public key contained in the previously sent certificate is used), or if the certification authority has not been declared valid beforehand or if the received fingerprint has been previously received in association with a certificate different from said certificate received in the pairing request.

According to embodiments, the pairing request is authorized if the first item of equipment possesses the private key associated with the certificate (for example if the encrypted random data in the response of the first item of equipment to the challenge sent by the managing device is able to be decrypted with the public key of the certificate), and/or if the certification authority has been declared valid beforehand and/or if the received fingerprint has not previously been received in association with a certificate different from the certificate received in the pairing request.

According to one feature, the managing method comprises determining a region in which the first item of equipment is located, and modifying the illumination generated by at least one light source of the managing device, in order to visually identify said region in which the first item of equipment is located.

For example, if the pairing request is authorized, the light sources of the managing device are configured to illuminate the region in which the first item of equipment is located.

Thus, an item of equipment making a pairing request may be identified visually.

According to one feature, the managing method comprises modifying the illumination generated by at least one light source of the managing device, to visually indicate whether the pairing request has been authorized or refused.

For example, different colors may be selected for the light emitted by at least one light source of the managing device to indicate whether the pairing request has been authorized or refused.

According to one feature, if the pairing request is authorized, the managing method further comprises receiving an identity datum identifying the user of the first item of equipment and verifying the identity of the user depending on said received identity datum.

This feature adds security to the exchanges between the items of equipment.

According to one feature, if the pairing request is authorized, the managing method further comprises transmitting at least a second pairing request to a third item of equipment connected by a wired connection to the managing device.

Thus, once the first item of equipment has been paired with the second item of equipment, it is possible to pair the first item of equipment with other items of equipment connected to the managing device via a wired link.

According to another feature, if the pairing request is authorized, the managing method further comprises transmitting at least a second pairing request to a third item of equipment connected by an optical connection to the managing device.

Thus, once the first item of equipment has been paired with the second item of equipment, it is possible to pair the first item of equipment with other items of equipment connected to the managing device via an optical communication channel.

The present invention relates, according to a second aspect, to a device for managing a request to pair a first item of equipment with a second item of equipment. The managing device is configured to communicate with the first item of equipment via an optical communication channel, and comprises:
- a receiving module configured to receive, via the optical communication channel, a pairing request comprising data representative of the identity of the first item of equipment,
- an authorizing module configured to authorize or refuse the pairing request depending on the result of said at least one verification of the data representative of the identity of the first item of equipment, and
- a transmitting module configured to transmit, via the optical communication channel, a security key to the first item of equipment, if the pairing request is authorized.

According to one embodiment, the transmitting module is further configured to transmit to the first item of equipment a first datum generated randomly on receipt of the pairing request.

According to one feature, the managing device comprises a verifying module configured to verify whether the first item of equipment possesses the private key associated with the certificate.

According to one embodiment, the verifying module is configured to:
- receive, from the first item of equipment, a second datum corresponding to the first datum encrypted,
- decrypt the second datum with a public key contained in the received certificate, and
- determine that the first item of equipment possesses the private key, if the decrypted second datum corresponds to the generated first datum.

According to one feature, the verifying module is further configured to verify whether the received certificate was issued by a predetermined certification authority.

According to one feature, the verifying module is further configured to verify whether the first item of equipment associated with the received certificate is authorized to pair.

For example, the verifying module is configured to consult, in a database, data associated with said certificate, and to determine, depending on the data associated with said certificate, whether the certificate is authorized to pair via said managing device.

According to one feature, the verifying module is configured to verify whether the fingerprint has been previously received in association with a certificate different from said certificate received in the pairing request.

According to one feature, the managing device further comprises a determining module configured to determine a region in which the first item of equipment is located, and an illumination-modifying module configured to modify the illumination generated by at least one light source of the managing device, in order to visually identify said region in which the first item of equipment is located.

According to one feature, the illumination-modifying module is configured to modify the illumination generated by at least one light source of the managing device, to visually indicate whether the pairing request has been accepted or refused.

According to one feature, the managing device further comprises a second verifying module configured to verify the identity of the user of the first item of equipment.

According to one feature, the managing device further comprises a transmitting module configured to transmit at least a second pairing request to a third item of equipment connected by a wired connection to the managing device.

The features of the managing method and of the managing device below may be implemented in isolation or in combination with one another.

The present invention relates, according to a third aspect, to an item of equipment such as an access gateway comprising a managing device according to the invention.

The item of equipment comprising the managing device may be any other connected object or item of equipment.

The present invention relates, according to a fourth aspect, to a computer program able to be implemented on a managing device, the program comprising code instructions for implementing the steps of the managing method according to the invention, when it is executed by a processor.

The present invention relates, according to a fifth aspect, to a data medium readable by a processor in a managing device, on which is stored a computer program comprising code instructions for implementing the steps of the managing method according to the invention, when it is executed by the processor.

The managing device, the gateway, the computer program and the data medium have features and advantages analogous to those described above in relation to the managing method.

BRIEF DESCRIPTION OF THE DRAWINGS

Other particular features and advantages of the invention will become more clearly apparent in the following description. In the appended drawings, which are given by way of non-limiting examples.

DETAILED DESCRIPTION OF ILLUSTRATIVE EMBODIMENTS

Figure 1:
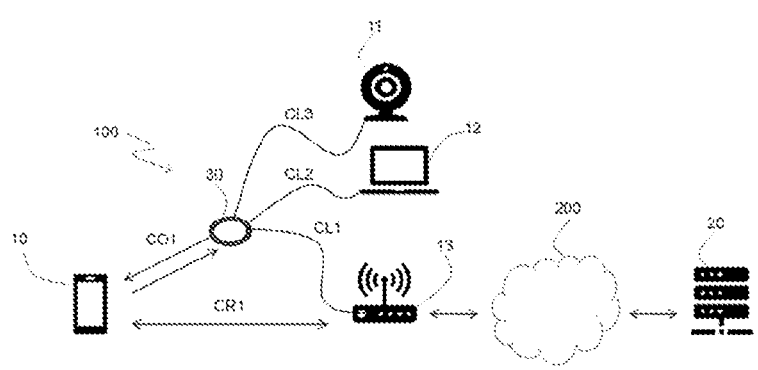
FIG. 1 schematically illustrates the context of the invention.

FIG. 1 shows a set of items of equipment 10-13 configured to implement radio-wave communications. These items of equipment 10-13 may form a local area network 100, or LAN, such as a home network or a business network. One of the items of equipment is an access gateway 13 allowing the items of equipment 11-12 of the local area network 100 to access a wide area network 200, or WAN, such as the Internet.

In the example shown, the local area network 100 is formed by a mobile telephony terminal 10, a surveillance camera 11, a laptop computer 12 and an access gateway 13. Other items of equipment (not shown) may form part of the local area network 100, such as a tablet, a printer, an audio speaker, a television decoder, a television set, a games console, a household appliance, a sensor (of temperature, brightness, humidity, etc.), or any other connected object, that is to say any object configured to transmit or receive information via a communication network.

These items of equipment may communicate with one another by means of radioelectric waves, via the local area network 100 or via two-way exchanges.

The items of equipment 10-13 for example use the IP protocol (IP standing for Internet Protocol) to communicate with one another and to communicate with the wide area network 200. They may also communicate with each other according to wireless communication standards such as Wi-Fi or Bluetooth, inter alia.

The access gateway 13 is configured to allow the items of equipment 10-12 to send requests to a server 20 in the wide area network 200 and to receive in return responses from the server 20. By way of illustration, the server 20 is a server through which content, such as audio or video content, electronic messages or websites, is made available.

At least one of the items of equipment 10-13 is configured to establish an optical communication channel CO1 with a light source 30.

A single light source 30 has been shown in FIG. 1. Of course, the number of light sources may be different.

Figure 2:
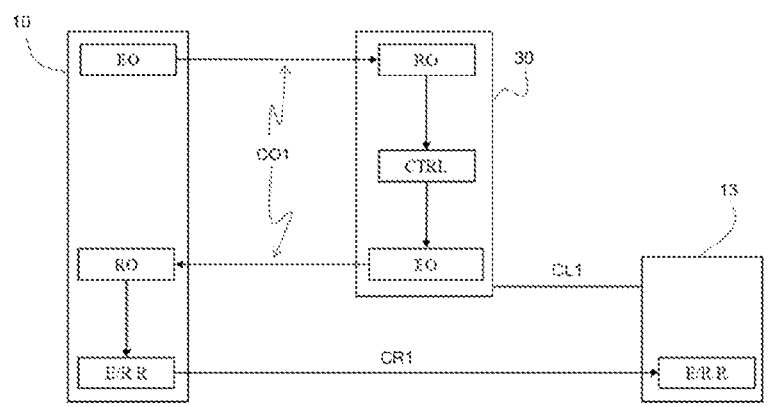
FIG. 2 is a schematic showing the first item of equipment, the second item of equipment and a managing device according to one embodiment of the invention.

In particular, as shown in FIG. 2, the first item of equipment 10 comprises an optical emitter and a photoreceiver.

In the example shown, the first item of equipment 10 is a mobile telephony terminal of smartphone type. The other items of equipment 11, 12, 13 are, in this example, a surveillance camera 11, a laptop computer 12 and an access gateway 13 and are connected to the light source 30 via wired links CL3, CL2 and CL1, respectively.

In another embodiment (not illustrated), all of the items of equipment are linked to the light source via optical means. In this embodiment, each item of equipment communicates with the managing device via an optical communication channel.

FIG. 2 schematically represents a first item of equipment 10, a second item of equipment 13 and a light source 30.

In the described example, the first item of equipment 10 is a mobile telephony terminal and the second item of equipment 13 an access gateway 13.

Of course, the invention is not limited to these items of equipment and is applicable to other items of equipment as indicated below.

The light source 30 is for example an LED lamp (LED standing for Light-Emitting Diode) or a "spot light", i.e. a light ensuring localized illumination. The light source 30 is configured, in addition to emitting light for the primary purpose of providing illumination, to pass information by means of the light. In one embodiment, the light source 30 is configured to send information using Li-Fi technology (Li-Fi standing for Light Fidelity) or equivalent technologies. In Li-Fi technology, data are encoded and sent via modulation of the amplitude of the light signal.

The light source 30 may comprise a plurality of light-emitting diodes or LEDs. According to embodiments, the light-emitting diodes may have the same color or different colors. The colors of the light-emitting diodes may be used to convey visual information to the users of the items of equipment. For example, as will be described below, diodes of one color may emit light while a pairing request is being processed, or upon success or failure of a pairing request, etc.

In one embodiment, the light-emitting diodes form an optical emitter EO_30. Furthermore, the light source 30 comprises an optical receiver or photoreceiver RO_30 for receiving light signals from light sources of the items of equipment 10-13. The photoreceiver RO_30 is configured to demodulate the received signal and to obtain the data sent. For the photoreceiver RO to receive data, it must be located in the region illuminated by the light source sending the data.

The light source 30 further comprises a control module CTRL_30 comprising electronic circuits configured to implement the method for managing a pairing request according to the invention. This method will be described below with reference to FIG. 3. Thus, the light source 30 forms a device for managing a pairing request. This managing device 30 may be integrated into an item of equipment, into the access gateway 13 inter alia for example, or may be independent of the items of equipment 10-13 as shown in FIG. 1 in which the managing device is a spot light.

In the embodiment shown, the terms managing device, light source and spot light correspond to the same device 30.

In the embodiment shown, the second item of equipment 13 is connected to the spot light 30 by means of a wired connection. For example, this wired connection is an Ethernet or PLC connection (PLC standing for Power-Line Communication).

The first item of equipment 10 comprises an optical emitting module or optical emitter EO_10, and an optical receiving module, optical receiver or photoreceiver RO_10.

It will be noted that in order for the first item of equipment 10 and the spot light 30 to be able to establish a communication channel CO1, the photoreceiver RO_30 of the spot light 30 must be located in the region illuminated by the optical emitter EO_10 of the first item of equipment 10, and the photoreceiver RO_10 of the first item of equipment 10 must be in the region illuminated by the optical emitter EO_30 of the spot light 30.

By region illuminated by an optical emitter, what is meant is the region that receives the light beams emitted by the optical emitter, or the region in which an optical receiver is able to receive the light beams emitted by the optical emitter.

The first item of equipment further comprises a radio transmitter and a radio receiver E/R_R_10 allowing radio communication (or communication by means of radio waves) with other items of equipment 11-13, and in this embodiment shown with the second item of equipment 13.

The second item of equipment 13 also comprises a radio transmitter and a radio receiver E/R_R_13 allowing radio communication (or communication by means of radio waves) with other items of equipment 10-12, and in this embodiment shown with the first item of equipment 10.

It will be noted that the items of equipment 10 and 13 and the spot light 30 are equipped with communication interfaces (not illustrated) configured to implement the aforementioned communications. Thus, in the embodiment described, the first item of equipment 10 comprises a first interface suitable for optical communications and a second interface suitable for radio communications. The spot light 30 comprises a first interface suitable for optical communications and a second interface suitable for wired communications. The second item of equipment 20 comprises a first interface suitable for wired communications and a second interface suitable for radio communications. Furthermore, the second item of equipment 20 comprises a third interface suitable for conducting communications with the wide area communications network 200. In particular, this third interface allows the devices 10-12 of the local area network 100 to send requests to servers 40 in the wide area network and to receive responses.

Figure 3:
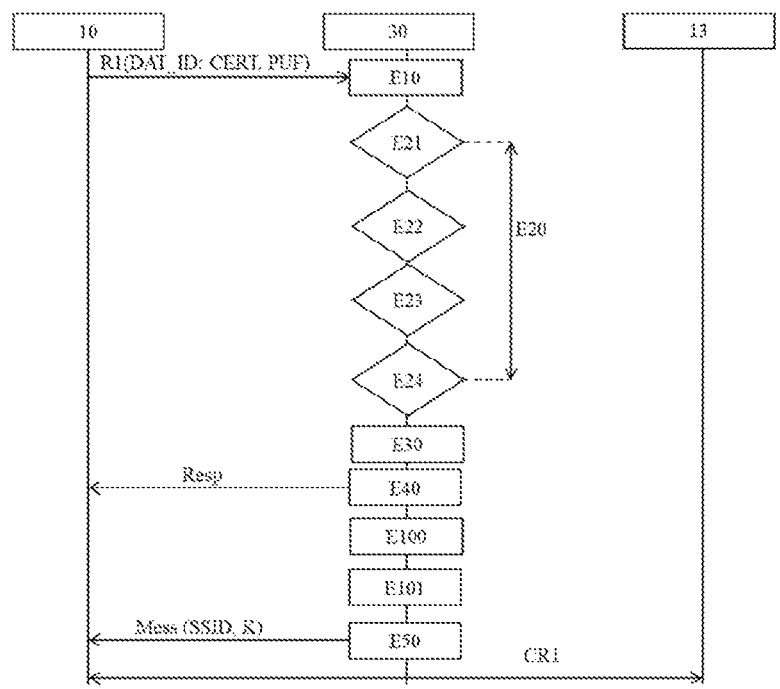
FIG. 3 illustrates steps of the managing method according to one embodiment of the invention.

FIG. 3 illustrates steps of the method for managing a request to pair the first item of equipment 10 with the second item of equipment 13, according to one embodiment. The managing method is implemented by the managing device 30, the managing device being in one embodiment a spot light.

When the first item of equipment 10 asks to pair with the second item of equipment 13, the managing device 30 receives E10 a pairing request from the first item of equipment 10.

In one embodiment, the pairing request R1 is received by the managing device 30 via an optical communication channel CO1 (FIGS. 1 and 2).

The pairing request comprises data DAT_ID representative of the identity of the first item of equipment 10.

The data DAT_ID representative of the identity of the first item of equipment 10 make it possible to uniquely identify this first item of equipment 10.

In one embodiment, the data representative of the identity of the first item of equipment 10 comprise a certificate CERT associated with the first item of equipment 10.

The certificate CERT was generated beforehand for this first item of equipment by a certification authority, in association with a public key K2. This public key K2 is contained in the certificate CERT and makes it possible to decrypt data encrypted with the private key K1. Thus, a public key and a private key are associated with the certificate CERT.

According to one embodiment, the managing device 30 comprises a list of trusted certification authorities, including the certification authority that generated the certificate CERT associated with the first item of equipment 10.

This list of certification authorities may be updated.

Certificates and encryption algorithms are known to those skilled in the art and will not be described here.

Thus, in one embodiment, the pairing request R1 sent to the managing device 30 comprises the certificate CERT associated with the first item of equipment.

In one embodiment, the data DAT_ID representative of identity further comprises a fingerprint PUF that uniquely identifies the first item of equipment 10.

Thus, in this embodiment, the pairing request R1 comprises the certificate CERT and the fingerprint PUF uniquely identifying the first item of equipment 10.

The fingerprint PUF may be defined as a sequence of data uniquely identifying the first item of equipment. This fingerprint is generated E0 by the first item of equipment prior to the transmission of a pairing request. The same fingerprint is generated each time and it remains the same over time.

In one embodiment, the fingerprint associated with the first item of equipment 10 is generated using a PUF (PUF standing for Physical Unclonable Function). Electronic components are all different in their physical structure. During the manufacture of electronic components, physical variations occur; these variations make it possible to differentiate between otherwise identical electronic components manufactured at the same time using identical manufacturing processes.

A physical unclonable function or PUF may be defined as a physical entity in an electronic component. This physical unclonable function or PUF is used to generate of the PUF fingerprint.

In one embodiment, the fingerprint is generated by means of an optical physical unclonable function or optical PUF present in the first item of equipment 10. An optical PUF is formed by a transparent material doped with light-scattering particles. When light passes through this transparent area, an image is generated by illuminating this area. This area being unique (or unclonable), the generated image is unique to each optical PUF and consequently to each item of equipment.

The sequence of data representative of the generated image forms the fingerprint PUF.

Optical PUFs and generation of a fingerprint of this type are known to those skilled in the art and will not be described in detail here.

In a known manner, the optical PUFs are located downstream of the optical emitter. Thus, the generated image is related to imperfections in the optical lens of the optical emitter.

According to one embodiment, the fingerprint PUF is generated each time the first item of equipment 10 transmits. Thus, the fingerprint PUF is generated each time a pairing request R1 is sent to the managing device 30.

According to another embodiment, the fingerprint PUF may only be generated the first time a request to pair an item of equipment is made. In this embodiment, the managing device stores in memory the fingerprint associated with the item of equipment with a view to implementing the verifications required for future pairings.

When the managing device receives E10 a pairing request, it extracts the data identifying the first item of equipment 10. In this embodiment, the managing device 30 extracts the certificate CERT, and the fingerprint PUF uniquely identifying the first item of equipment 10.

In other embodiments, the received pairing request comprises only one of the aforementioned data identifying the first item of equipment.

In one embodiment, the managing device 30 stores the received certificate CERT in association with the received fingerprint PUF.

For example, the certificate and the fingerprint are stored in the memory of the managing device 30 or in a database connected to the managing device 30. For example, the database may be located in a server 20 connected to the managing device 30 via the second item of equipment 13. In another embodiment, the server may be connected directly to the managing device or via an item of equipment other than the second item of equipment.

The managing device 30 receiving the pairing request R1 implements a verification E20 of the data identifying the first item of equipment 10.

The verification implemented differs depending on the embodiment.

Depending on the embodiment, the verification E20 may comprise:
- verifying E21 whether the first item of equipment 10 possesses the private key K1 associated with the certificate CERT,
- verifying E22 whether the certification authority that issued the certificate CERT is present in a list of trusted certification authorities stored in the managing device,
- verifying E23 whether the first item of equipment associated with the received certificate CERT is authorized to pair, and
- verifying E24 whether the fingerprint PUF has been previously received in association with a certificate different from the certificate CERT received in the pairing request R1.

The verification E20 comprises at least one of the verification operations E21, E22, E23, E24 mentioned above. Furthermore, all combinations may be possible.

In the embodiment described, the verification E20 comprises verifying whether the first item of equipment 10 possesses the private key K1 associated with the certificate CERT, whether the certification authority that issued the certificate CERT is present in a list of trusted certification authorities, verifying (not illustrated) whether the first item of equipment associated with the received certificate CERT is authorized to pair and whether the fingerprint PUF has been previously received in association with a certificate different from the certificate CERT received in the pairing request R1 (verifications E21, E22, E23 and E24).

The verifications consisting in verifying whether the device associated with the received certificate CERT is authorized to pair or whether the fingerprint PUF has been previously received in association with a different certificate may be implemented by consulting, in a database, data associated with the certificate CERT. Depending on the data associated with the certificate CERT, it may be determined whether the certificate CERT is authorized for pairing via the managing device 30.

The database may be none other than the database in which the received certificates CERT and fingerprints PUF are stored in association, or a different database.

By way of non-limiting example, the data associated with the certificate comprise the certification authority that issued the certificate, a serial number contained in the certificate, the name of the user of the first item of equipment and an identifier of the managing device. Thus, it may be verified whether a user of the first terminal is authorized to pair via the managing device. The identifier of the managing device may be an identifier of a meeting room in which the managing device is placed.

Depending on the result of the verification E20, the managing device 30 determines E30 whether the pairing request is authorized or refused.

In the embodiment shown, if the first item of equipment 10 possesses the private key associated with the certificate CERT included in the pairing request R1, if the certification authority has been previously declared as valid, if the certificate CERT may be used for pairing and if the fingerprint received has not been previously received in association with a certificate different from the certificate received in the pairing request, the pairing request is authorized E30.

If the result of one of the verifications E21, E22, E23, E24 is negative, i.e. if the first item of equipment 10 possesses the private key K1 associated with the certificate CERT included in the pairing request R1, or if the certification authority has not been previously declared as valid, or if the certificate CERT may be used for pairing, or if the fingerprint received has been previously received in association with a certificate different from said certificate received in the pairing request, the pairing request is refused E30.

In one embodiment, possession of the private key is verified E21 as follows.

The managing device 30, upon receipt of the pairing request R1, randomly generates a datum and transmits it to the first item of equipment 10. The first item of equipment 10 encrypts this datum and transmits it to the managing device 30. To verify whether the first item of equipment 10 possesses the private key associated with the certificate CERT received in the pairing request R1, the managing device 30 decrypts the received datum using the public key associated with the certificate CERT, this public key being contained in the certificate CERT. If the obtained datum corresponds to the datum that it previously generated and sent to the first item of equipment 10, the managing device determines that the first item of equipment possesses the private key. If on the contrary the obtained datum does not correspond to the datum that it previously generated and sent to the first item of equipment 10, the managing device determines that the first item of equipment does not possess the private key.

The managing device 30 sends E40 a response, via the optical communication channel CO1, to the first item of equipment 10 informing it of the authorization or refusal of the pairing request. Next, the managing device 30 sends E50 to the first item of equipment 10 identification data of the second item of equipment 20, for example its service set identifier (SSID) or a security key. These identification data of the second item of equipment 13 allow communications between the first item of equipment 10 and the second item of equipment 13 to be secured once they have been paired.

By way of non-limiting example, the managing device 30 may send a WPA key (WPA standing for Wi-Fi Protected Access) of the gateway 13 (second item of equipment).

In one example in which the managing device and the second item of equipment are integrated into the same device, the managing device may send the first item of equipment a security key associated with the managing device, the key of the spot light for example.

Once the first item of equipment 10 has the identification data of the second item of equipment 13, it is able to establish a connection with the second item of equipment 13 and to send it its own identification data.

In one embodiment, the exchanges between the first item of equipment 10 and the managing device 30 are carried out according to a Diffie-Hellman protocol.

In particular, the first item of equipment 10 and the managing device 30 use the Diffie-Hellman protocol to compute a key, called the session key. This session key is used for exchanges between the first item of equipment 10 and the managing device 30. In this embodiment, the first item of equipment 10 sends to the managing device 30 the pairing request R1 encrypted with the computed session key. Furthermore, the managing device 30 sends to the first item of equipment 10 the identification data of the second item of equipment 13 encrypted with the session key.

Furthermore, the exchanges between the first item of equipment 10 and the managing device 30 required to verify the possession of the private key K1 associated with the certificate CERT by the first item of equipment 10 are implemented using the computed session key.

In certain embodiments, the managing device comprises in memory the identification data of the items of equipment to which it is connected. In other embodiments, the identification data are obtained by the managing device during the implementation of the method for managing a pairing request, so that it may exchange the identification data between the first item of equipment and the second item of equipment.

Next, the first item of equipment 10 and the second item of equipment may communicate via a radio communication channel CR1.

In certain embodiments, when the pairing request has been validated, an identity datum identifying the user of the first item of equipment 10 is verified.

This feature adds security to the exchanges between the items of equipment.

The first item of equipment and the second item of equipment may further communicate via the optical communication channel established between the first item of equipment and the managing device and the wired communication channel between the managing device and the second item of equipment. The managing device functions as an intermediary between the first item of equipment and the second item of equipment.

Thus, these communication channels that were used previously during the pairing phase continue to be used subsequently during phases of communication. It may be very useful to use these communication channels, for example for communications in environments where communications by radio must be avoided, for example in hospitals, crèches or the like. In the illustrated embodiment, once the first item of equipment has been paired with the second item of equipment, the first item of equipment 10 may either communicate with the second item of equipment via the radio communication channel CR1, or via the managing device 30, i.e. via the optical communication channel CO1 and the wired communication channel CL1.

The managing device 30 may determine E100 the region in which the first item of equipment is located. This information is determined by the photoreceiver RO_30 of the managing device. Depending on this information, the illumination generated by at least one light source of the managing device (or spot light) 30 is modified E101 to visually identify the region in which the first item of equipment 10 is located.

For example, a first group of light sources or LEDs may turn on and a second group of light sources or LEDs may turn off so as to illuminate only the region in which the first item of equipment 10 is located.

Thus, an item of equipment initiating pairing may be identified visually. By virtue of this feature, an unauthorized user may be easily spotted.

In certain embodiments, the color of the light emitted by the spot light may change depending on the result of the verification E20. This feature makes it possible to indicate visually whether the pairing request has been accepted or refused.

For example, different colors may be selected for the light emitted by at least one light source of the managing device 30 to indicate whether the pairing request has been accepted or refused.

In one embodiment, when the pairing request has been validated, the managing method further comprises transmitting at least a second pairing request to a third item of equipment 11, 12 connected by a wired connection to the managing device 30.

For example, the managing device 30 comprises a list of items of equipment 11-13 to which it is connected. Once the pairing request from the first item of equipment 10 has been validated, the user of the first item of equipment 10 may select at least one second item of equipment from the list, with a view to initiating a pairing request.

This new pairing request may not require the verifications carried out previously to be implemented again, for example if the new pairing request is transmitted in the same session. In this case, pairing with other items of equipment is thus achieved rapidly.

According to one variant, once pairing with the second item of equipment 13 as requested by the first item of equipment 10 has been authorized, pairing with the other items of equipment 11, 12 connected to the managing device 30 occurs automatically.

This makes it possible to efficiently and securely pair with a number of items of equipment.

Figure 4A:
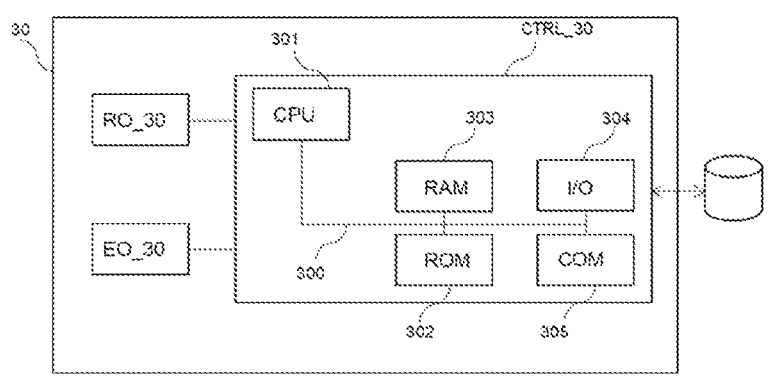
FIG. 4a illustrates a hardware architecture able to implement the managing method according to the invention.

FIG. 4a schematically illustrates a hardware architecture of a managing device 30 able to implement the managing method according to the invention.

The managing device 30 comprises an optical receiver or photoreceiver RO_30, an optical emitter EO_30 and a control module CTRL_30. This control module CTRL_30 comprises a communication bus 300 to which are connected:
- a processing unit 301, called CPU in the figure (CPU standing for Central Processing Unit), possibly comprising one or more processors;
- a non-volatile memory 302, for example a read-only memory (ROM), an electrically erasable programmable read-only memory (EEPROM) or a flash memory;
- a random-access memory 303 or RAM;
- an input/output interface 304, called I/O in the figure, for example keys or buttons, a screen, a keypad, a mouse or another pointing device such as a touchscreen or a remote controller allowing a user to interact with the managing device 30 via a graphical interface or a human-machine interface; and
- communication interfaces 305, called COM in the figure, suitable for exchanging data for example with the first item of equipment 10, with the second item of equipment 13, or with a database DB via a communication network 100, 200. These communication interfaces 305 are in particular configured to establish optical communication channels CO1, radio communication channels CR1 or wired communication channels CL1, CL2, CL3.

The random-access memory 303 contains registers suitable for storing variables and parameters that are created and modified during the execution of a computer program comprising instructions for implementing the managing method according to the invention. The instruction codes of the program stored in the non-volatile memory 302 are loaded into the memory RAM 303 in order to be executed by the processing unit CPU 301.

The non-volatile memory 302 is for example a rewritable EEPROM memory or flash memory able to constitute a medium within the meaning of the invention, i.e. able to comprise a computer program comprising instructions for implementing the managing method according to the invention. The rewritable memory may for example comprise a database in which certificates CERT are stored in association with fingerprints PUF, or comprising a list of items of equipment connected to the managing device 30, or a list of authorized certification authorities. This database may be updated as pairing requests are received.

Figure 4B:
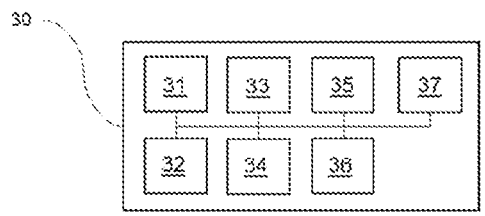
FIG. 4b is a functional depiction of a managing device according to one embodiment of the invention.

This program, by way of its instructions, defines functional modules of the managing device 30 that are implemented and/or control the hardware elements described above. FIG. 4b is a functional representation of a device 30 for managing a pairing request according to one embodiment.

These modules especially comprise:
- a receiving module 31 configured to receive, via the optical communication channel CO1, a pairing request comprising data representative of the identity of the first item of equipment 10,
- an authorizing module 32 configured to authorize or refuse the pairing request depending on the result of said at least one verification E20 of the data representative of the identity of the first item of equipment 10, and
- a transmitting module 33 configured to transmit, via the optical communication channel CO1, a security key to the first item of equipment 10, if the pairing request is authorized.

In one embodiment, the transmitting module 33 is further configured to transmit to the first item of equipment a first datum generated randomly on receipt of the pairing request R1.

According to embodiments, the managing device comprises a verifying module 34 configured to:
- verify whether the first item of equipment possesses the private key associated with the certificate, for example by verifying whether a received encrypted datum is able to be decrypted with a public key contained in the certificate,
- verify whether the certificate was issued by a predetermined certification authority,
- verify whether the first item of equipment associated with the received certificate is authorized to pair, or
- verify whether the fingerprint has been previously received in association with a certificate different from said certificate received in the pairing request.

The managing device 30 may further comprise, depending on the embodiment:
- a determining module 35 configured to determine a region in which the first item of equipment is located, and an illumination-modifying module configured to modify the illumination generated by at least one light source of the managing device, in order to visually identify said region in which the first item of equipment is located, and/or
- a second verifying module 36 configured to identify the user depending on said received identity datum, and/or
- a transmitting module 37 configured to transmit at least a second pairing request to a third item of equipment connected by a wired connection to the managing device.

The aforementioned modules and means are controlled by the processor of the processing unit 301. They may take the form of a program able to be executed by a processor, or the form of hardware, such as an application-specific integrated circuit (ASIC), a system on chip (SoC), or a programmable logic circuit such as a field-programmable gate array (FPGA).

The first item of equipment 10 also comprises a communication bus to which there are connected a processing unit or microprocessor, a non-volatile memory, a random-access memory or RAM, and a communication interface suitable in particular for exchanging data with the managing device 30. The first item of equipment 10 may for example send to the managing device 30 a request to pair with a second item of equipment 13. Furthermore, the first item of equipment 10 may receive messages from the managing device 30, for example with a view to informing it whether the pairing request has been accepted or refused or to sending it cryptographic keys.

In certain embodiments, the managing device 30 is integrated into the second item of equipment 13, this second item of equipment being, by way of non-limiting example, an access gateway.

Although the present disclosure has been described with reference to one or more examples, workers skilled in the art will recognize that changes may be made in form and detail without departing from the scope of the disclosure and/or the appended claims.

The invention claimed is:

1. A method for managing a request to pair a first item of equipment with a second item of equipment, which is implemented by a managing device for managing a pairing request, said managing device being configured to communicate with the first item of equipment via an optical communication channel, said managing method comprising:
   receiving, via said optical communication channel, a pairing request comprising data representative of an identity of the first item of equipment; and
   in response to the pairing request being authorized, transmitting, via said optical communication channel, to the first item of equipment, a security key to be used during communications between the first item of equipment and the second item of equipment once the items of equipment have been paired.

2. The method according to claim 1, wherein said data representative of the identity of the first item of equipment comprise a certificate associated with the first item of equipment.

3. The method according to claim 2, wherein said data representative of the identity of the first item of equipment comprise a sequence of data representative of a fingerprint uniquely identifying said first item of equipment.

4. The method according to claim 3, wherein said sequence of data is generated by said first item of equipment prior to the transmission of said pairing request to said managing device.

5. The method according to claim 3, comprising authorizing or refusing the pairing request depending on a result of at least one verification of said data representative of the identity of the first item of equipment comprising verifying whether said sequence of data representative of a fingerprint has been previously received in association with a certificate different from said certificate received in said pairing request.

6. The method according to claim 2, comprising authorizing or refusing the pairing request depending on a result of at least one verification of said data representative of the identity of the first item of equipment comprising verifying whether the first item of equipment possesses a private key associated with said certificate.

7. The method according to claim 2, comprising authorizing or refusing the pairing request depending on a result of at least one verification of said data representative of the identity of the first item of equipment comprising verifying whether said certificate was issued by a predetermined certification authority.

8. The method according to claim 2, comprising authorizing or refusing the pairing request depending on a result of at least one verification of said data representative of the identity of the first item of equipment comprising verifying whether the first item of equipment associated with the received certificate is authorized to pair.

9. The method according to claim 1, comprising determining a region in which the first item of equipment is located, and modifying an illumination generated by at least one light source of said managing device, in order to visually identify said region in which the first item of equipment is located.

10. The method according to claim 1, wherein, in response to the pairing request being authorized, the managing method further comprises transmitting at least a second pairing request to a third item of equipment connected by a wired connection to the managing device.

11. A managing device for managing a request to pair a first item of equipment with a second item of equipment, the managing device being configured to communicate with said first item of equipment via an optical communication channel, and comprising:

a processor; and a non-transitory computer readable medium comprising instructions stored thereon which when executed by the processor configure the managing device to:

receive, via the optical communication channel, a pairing request comprising data representative of an identity of the first item of equipment; and transmit, via said optical communication channel, to the first item of equipment, in response to the pairing request being authorized, a security key to be used during communications between the first item of equipment and the second item of equipment once the items of equipment have been paired.

12. An item of equipment comprising the managing device according to claim 11.

13. A non-transitory data medium readable by a processor in a managing device, on which is stored a computer program comprising code instructions for implementing a managing method for managing a request to pair a first item of equipment with a second item of equipment, when the computer program is executed by the processor, wherein the managing device is configured to communicate with the first item of equipment via an optical communication channel, and said managing method comprises:

receiving, via said optical communication channel, a pairing request comprising data representative of an identity of the first item of equipment; and in response to the pairing request being authorized, transmitting, via said optical communication channel, to the first item of equipment, a security key to be used during communications between the first item of equipment and the second item of equipment once the items of equipment have been paired.

\* \* \* \* \*